Patented Jan. 16, 1934

1,943,710

UNITED STATES PATENT OFFICE 1,943,710

COMPOUND OF THE BENZANTHRONE-PYRAZOLANTHRONE SERIES AND A PROCESS OF PREPARING IT

Karl Wilke and Josef Stock, Frankfort-on-the-Main-Hochst, and Fritz Schubert, Frankfort-on-the-Main-Sindlingen, Germany, assignors to General Aniline Works, Inc., New York, N. Y., a corporation of Delaware No Drawing. Application February 20, 1930, Serial No. 430,120, and in Germany March 4, 1929

16 Claims. (Cl. 260—45)

The present invention relates to new compounds of the benzanthrone-pyrazolanthrone series and a process of preparing the same.

We have found that new valuable vat dyestuffs are obtainable by subjecting to the action of an alkaline condensing agent a compound of the following general formula:

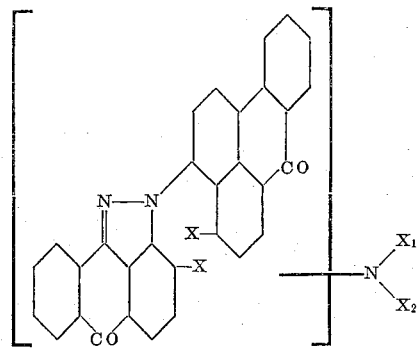

wherein X stands for hydrogen
$X_1$ stands for hydrogen
$X_2$ represents a polynuclear ring system, for instance, of an unsubstituted or a substituted anthraquinone or an anthraquinone derivative in a broad sense, for instance, of a benzanthrone, or

stands for a polynuclear heterocyclic ring system, for instance, of a pyrazolanthrone or a carbazole, N, $X_1$ and $X_2$ being members of the heterocyclic nucleus.

The reaction may be carried out at an elevated temperature, for instance, at about 90° C. to about 200° C. We prefer to use a temperature of about 100° C. and to prolong the reaction for about 5–9 hours.

The reaction is preferably carried out in the presence of an organic diluent with the addition of an alkaline condensing agent.

The new dyestuffs obtainable by the above condensation process possess the following general properties: they are dark pastes of a blackish violet to dark green to greenish black coloration. The dry dyestuff powders are bluish violet, violet black or greenish black. The products dissolve in concentrated sulfuric acid with a coloration varying between wine red, brown, brownish violet, blackish violet, brownish olive, green, grey green to greenish black. The vats are generally blue, in some cases grey or green. Cotton is dyed in these vats blue, grey or green shades. The fastness properties of the dyeings obtained are generally very good.

At the present time we could not yet definitely ascertain the constitutional formulæ of our new products. It is obvious that between the pyrazolanthrone nucleus and the benzanthrone nucleus a further ring closure occurs with the formation of benzanthrone-pyrazolanthrone that probably however, the dyestuff nucleus undergoes some further structural change during the condensation process inasmuch as the products obtainable according to our new process seem in many cases not to be identical with the products obtainable by reacting the corresponding amino compounds with a corresponding halogen substituted benzanthrone-pyrazolanthrone. From a chemical point of view it seems to be possible that at least in some cases a further formation of a carbazole or similar nucleus might occur according to the following probable formulæ:

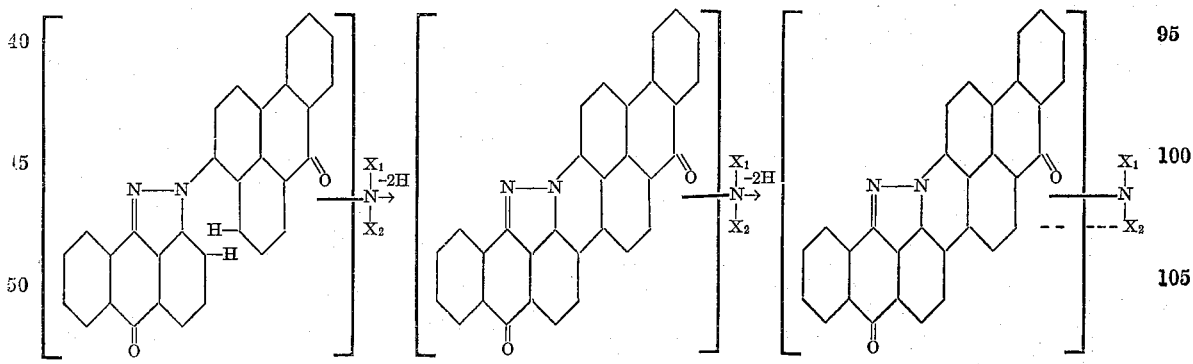

wherein $X_1$ stands for hydrogen
$X_2$ represents a polynuclear ring system, for instance, of an unsubstituted or a substituted anthraquinone or an anthraquinone derivative in a broad sense, for instance, of a benzanthrone.

The following examples serve to illustrate the invention but they are not intended to limit it thereto, the parts being by weight, unless otherwise stated:

(1) 55 parts of pyrazolanthrone and 20 parts of finely subdivided potassium carbonate are stirred for 2 hours in 1300 parts by volume of nitrobenzene, the temperature of the oil bath being about 195° C., whereby the red potassium salt of the pyrazolanthrone is formed, 95 parts of dibrominated benzanthrone are then introduced and the whole is heated to boiling for 4 hours while stirring. The mixture now contains monobromo - Bz- 1 -benzanthronyl Py - 1-pyrazolanthrone. It is allowed to cool for some time, a mixture of 56 parts of 1-aminoanthraquinone, 56 parts of anhydrous sodium acetate and 20 parts of copper carbonate is then introduced and the whole is again heated to boiling for 16 hours. After cooling, the sparingly soluble condensation product separates in the form of brilliant chocolate-brown crystals. It is filtered and washed with nitrobenzene, alcohol and water. Any copper salt which may still be present is removed by extraction with boiling dilute hydrochloric acid whereafter the product is dried. The anthraquinonylamino - Bz - 1 - benzanthronyl - Py- 1-pyrazolanthrone thus obtained dissolves in concentrated sulphuric acid to a brownish yellow solution from which reddish yellow flakes separate on dilution with water.

100 parts of the said anthraquinonylamino-benzanthronyl-pyrazolanthrone are melted, while stirring, with 500 parts of caustic potash and 400 parts of alcohol for about 7–8 hours at 95° C.—100° C. The mixture is then poured on water and the dyestuff thus formed, which is partly obtained in a dissolved state as leuco compound, is separated completely by blowing air through the aqueous suspension. After the precipitate has been filtered and washed, a nearly black paste is obtained which in the dry state forms a black dyestuff powder. The product dissolves in concentrated sulfuric acid to a green solution from which bluish grey flakes separate on addition of water. The dyestuff dyes cotton in a blue alkaline hydrosulfite vat greenish blue-grey shades of excellent properties of fastness.

The constitution of the dyestuff obtained according to this example is unknown. The new dyestuff yields greyish tints of a considerably more greenish hue than the dyestuff of Example 16 of the copending U.S. application Ser. No. 406,726 filed November 12, 1929, in the name of Karl Wilke, Josef Stock and Fritz Schubert.

(2) By substituting in Example 1 the same quantity of 2-amino-anthraquinone for the 1-amino-anthraquinone an isomeric anthraquinonylamino - Bz - 1 - benzanthronyl - Py - pyrazolanthrone is obtained in the form of a brown powder. It dissolves in concentrated sulphuric acid to a reddish brown solution from which it separates in yellowish brown flakes on dilution with water.

By treating this new intermediate product with an alkaline condensing agent according to Example 1, a dyestuff is obtained which dissolves in concentrated sulfuric acid to a blackish violet solution from which it separates in greenish blue-grey flakes on addition of water. It dyes cotton from a greenish-blue alkaline hydrosulfite vat clear blue-grey tints of a redder shade than that of the dyeing obtained with the dyestuff of Example 1.

(3) By substituting in Example 1, 30 parts of 1.4-diamino-anthraquinone for the 1-aminoanthraquinone, a condensation product is obtained in the form of a brownish black powder which dissolves in concentrated sulfuric acid to a brownish violet solution. By melting the condensation product with caustic potash a dyestuff is obtained which dissolves in concentrated sulfuric acid to a greenish black solution and dyes cotton in a blue vat bluish grey tints.

(4) By using in Example 1, instead of the aminoanthraquinone, 85.5 parts of 1-amino-4-benzoylaminoanthraquinone a (benzoyl-aminoanthraquinonyl) -amino-benzanthronyl-pyrazolanthrone is obtained in the form of a brownish black powder which dissolves in concentrated sulfuric acid to a brown solution. The dyestuff which is obtained by melting this intermediate product in alcoholic caustic potash at 100° C. is a dark green paste or a greenish black powder. It dissolves in concentrated sulfuric acid to a dark green solution from which it is precipitated, on dilution with water, in blue-green flakes. It dyes cotton in a blue-green vat a very greenish blue-grey.

By using 1-amino-5-benzoylamino-anthraquinone an isometric dyestuff is obtained in the form of a violet black paste or a black powder which dissolves in concentrated sulfuric acid to a green solution. In a finely dispersed state the dyestuff has a violet blue color and dyes in a greenish blue vat reddish blue-grey tints.

(5) By substituting in Example 1, 62.5 parts of 1-amino-anthraquinone-2-aldehyde for the aminoanthraquinone there is obtained, by way of a dark brown intermediate product which dissolves in sulfuric acid to a yellowish-red solution, a black dyestuff powder. The latter dissolves in concentrated sulfuric acid to a brown solution from which greenish blue-grey flakes separate on addition of water. The dyestuff gives a blue alkaline hydrosulfite vat and dyes cotton in a weak solution a neutral grey tint and in a concentrated solution a neutral black tint.

When melting the product in caustic potash, there occurs the condensation to the benzanthrone-pyrazolanthrone.

(6) 55 parts of pyrazolanthrone, 97 parts of dibrominated benzanthrone and 61.2 parts of Bz-1-aminobenzanthrone are either condensed and melted together as indicated in Example 1, or 55 parts of pyrazolanthrone and 93.5 parts of mononitrated Bz-1-bromobenzanthrone are condensed, reduced to the amino-compound and again condensed with 77.3 parts of Bz-1-bromo-benzanthrone and melted with caustic potash and alcohol. In both cases there is obtained, by way of a yellowish brown intermediate product which dissolves in sulfuric acid to a cherry red solution, a greenish-black dyestuff powder. The finished dyestuff dissolves in concentrated sulfuric acid to a brownish violet solution from which green flakes separate on dilution with water. The dyestuff dyes cotton in a blue alkaline hydrosulfite vat greenish blue-grey tints.

(7) There is stirred at boiling temperature for 12 hours a mixture of 26.4 parts of the condensation product obtained from equimolecular quantities of pyrazolanthrone and dibrominated benzanthrone, 23.2 parts of the reduced condensation product obtained from equimolecular quantities of pyrazoleanthrone and mono-nitrated Bz- 1-bromobenzanthrone, 600 parts of nitrobenzene, 25 parts of anhydrous sodium acetate and 6 parts of copper carbonate. After cooling, the product which has separated is filtered, washed, extracted by means of boiling dilute hydrochloric acid and dried. It is a brownish yellow powder which dissolves in concentrated sulfuric acid to a yellowish red solution.

By melting the intermediate body thus formed in alcoholic caustic potash at about 100° C., as described in Example 1, a dyestuff is obtained which dissolves in sulfuric acid to a violet-brown solution from which blue flakes separate on addition of water. The dyestuff gives a greenish blue vat which dyes cotton greenish blue-grey tints.

(8) This example describes the condensation of 1 molecular proportion of dibromo-benzanthrone with 2 molecules of pyrazolanthrone and production of a dyestuff from the product. 55 parts of pyrazolanthrone are stirred for half-an-hour at about 190° C. in 1300 parts of nitrobenzene in the presence of 35 parts of finely subdivided potassium carbonate and there is first obtained the potassium salt of the pyrazolanthrone. 48.7 parts of dibromobenzanthrone are then introduced and the whole is stirred for further 6 hours at boiling temperature. After cooling, the condensation product thus obtained is filtered, washed with nitrobenzene, alcohol and water and dried. It is a yellowish brown powder which dissolves in concentrated sulfuric acid to a yellowish red solution.

By melting this intermediate product with caustic potash in the presence of alcohol at about 100° C. a dyestuff is obtained which, in a dry state, is a bluish violet powder. It dissolves in concentrated sulfuric acid to a wine-red solution from which brilliant greenish-blue flakes separate on dilution with water. It gives a greenish blue alkaline hydrosulfite vat which dyes cotton clear greenish blue tints.

(9) By substituting in Example 1 a mixture of 45 parts of carbazole, 20 parts of potassium carbonate and 4 parts of copper carbonate for the mixture of aminoanthraquinone, sodium acetate and copper carbonate used in the second phase of the reaction, a brilliant orange yellow intermediate product of high melting point is obtained which dissolves in concentrated sulfuric acid to a yellowish red solution. By melting it in caustic potash a dyestuff is obtained which dyes cotton in a green-blue vat fast blue-grey tints.

(10) 51 parts of 8-chloropyrazolanthrone (cf. "Berichte der Deutschen Chemischen Gesellschaft," vol. 45, page 2247), 62 parts of Bz-1-bromobenzanthrone and 15 parts of finely subdivided potassium carbonate are first stirred together at boiling temperature in 1300 parts of nitrobenzene until no more sparingly soluble red salt of the pyrazolanthrone can be detected. A mixture of 45 parts of 1-aminoanthraquinone, 45 parts of anhydrous sodium acetate and 10 parts of copper carbonate is then introduced and the whole is further heated to boiling for 25 hours while stirring. On cooling the Bz-1-benzanthronyl-Py-1 (anthraquinonyl-1-amino-8-pyrazolanthrone) separates. After the solution has been worked up in the usual manner a reddish yellow brown powder is obtained which dissolves in concentrated sulfuric acid to a not very intense brownish red solution. When the product is melted in caustic potash according to Example 1, it is transformed into a vat-dyestuff which dyes cotton in a greenish grey-blue vat intense greenish grey-blue tints. The new product dissolves in sulfuric acid to a turbid wine-red solution from which blue-grey flakes separate on addition of water.

(11) When using in Example 10, 5-chloropyrazolanthrone (cf. British specification No. 264,503 in the name of I. G. Farbenindustrie Aktiengesellschaft of Frankfort-on-the-Main, Germany, dated January 13, 1926) instead of the isomeride a brownish yellow red Bz-1-benzanthronyl-Py-1-(anthraquinonyl-1-amino-5-pyrazolanthrone) is obtained which dissolves in concentrated sulfuric acid to a reddish brown-yellow solution and yields, when melted in caustic potash a dyestuff which dyes in a blue-grey vat grey-green tints. It dissolves in sulfuric acid to a grey-green solution from which olive green flakes separate on addition of water.

(12) 4-chloropyrazolanthrone (obtained from 1.4-dichloroanthraquinone and hydrazine in pyridine; a yellowish brown crystalline powder melting at 301–302° C. and dissolving in concentrated sulfuric acid to a reddish yellow solution with an orange fluorescence) yields, when worked up according to Example 10 a reddish yellow-brown Bz-1-benzanthronyl-Py-1-(anthraquinonyl 1-amino-4-pyrazolanthrone) which dissolves in sulfuric acid to reddish yellow-brown solution. The dyestuff which is obtained by melting the product in caustic potash gives a greyish violet-blue vat which dyes cotton olive-green tints. It dissolves in sulfuric acid to a brownish olive solution from which olive-colored flakes separate on addition of water.

(13) When using in Example 10, 60 parts of 3-bromopyrazolanthrone (obtainable from 1.3-dibromoanthraquinone and hydrazine in a solution of pyridine; melting point 310° C.–311° C.) instead of the chlorine derivative there is obtained a dark red-brown Bz-1-benzanthronyl-Py-1-(anthraquinonyl-1-amino-3-pryazolanthrone) and from this intermediate product a dyestuffs which dyes cotton in a blue-grey vat olive green tints. The dry dyestuff dissolves in sulfuric acid to an olive-green solution from which grey-green flakes separate on addition of water.

(14) When using in Example 1, 64 parts of 5-chloropyrazolanthrone instead of the pyrazolanthrone and, furthermore, twice the quantity of 1-amino-anthraquinone and sodium acetate there is obtained as intermediate product a bordeaux-red dianthraquinonylamino-benzanthronyl-pyrazolanthrone and from the latter a dyestuff which dyes cotton in a grey vat olive grey tints and dissolves in sulfuric acid to a green solution.

When working up 8-chloropyrazolanthrone in the same way there is obtained a vat dyestuff dyeing grey tints.

(15) By condensing 23.5 parts (1 mol.) of 8-amino-pyrazolanthrone (cf. U. S. patent specification No. 1,329,435) with 62 parts (2 mol.) of Bz-1-bromobenzanthrone there is obtained as intermediate product a red powder which yields, when melted in caustic potash a dyestuff dissolving in sulfuric acid to a brown red solution and dyeing in a green-blue vat greenish blue-grey tints.

(16) By benzanthronizing 1.4-dichloro-anthraquinone in known manner a 5.8-dichlorobenzanthrone is obtained melting at 157° C.–158° C. and by brominating the latter product a Bz-1-bromo-5.8-dichlorobenzanthrone is obtained melting at 225° C.–226° C.

By condensing 18.9 parts of the said Bz-1- bromo-5.8-dichlorobenzanthrone with 11 parts of pyrazolanthrone and subsequently with 25 parts of 1-aminoanthraquinone according to Example 1, a dark brown halogen-free Bz-1-[di-(anthraquinonyl-1-amino)-5.8-benzanthronyl]-Py-1-pyrazolanthrone is obtained which dissolves in concentrated sulfuric acid to a red brown solution. When this intermediate product is melted in caustic potash it condenses to a dyestuff which dissolves in concentrated sulfuric acid to a yellowish green solution and dyes cotton in a green vat greenish grey tints.

(17) By substituting in Example 1, 60 parts of 1.2-diamino-anthraquinone for the 1-aminoanthraquinone, there is obtained as intermediate product a brownish black amino-anthraquinonyl-amino-benzanthronyl-pyrazolanthrone which dissolves in concentrated sulfuric acid to a brown-red solution and yields a dyestuff which dyes cotton in a greenish blue vat vivid blue-grey tints. The dry dyestuff powder dissolves in concentrated sulfuric acid to a blackish brown solution from which it separates in the form of bluish green flakes on addition of water.

(18) 15.5 parts of dichloro-benzanthronyl-pyrazolanthrone (obtainable by causing chlorine to act for five hours at ordinary temperature upon Bz-1-benzanthronyl-Py-1-pyrazolanthrone in a solution of chlorosulfonic acid in the presence of iodine; a yellow brown powder, soluble in concentrated sulfuric acid to a carmine red solution, content of chlorine 14.9 per cent, calculated for the entrance of 2 atoms of chlorine=13.7 per cent) are heated to boiling for 18 hours with 18 parts of 1-amino-anthraquinone, 30 parts of sodium acetate, 0.5 part of copper carbonate and a trace of copper powder in 300 parts of nitrobenzene, while stirring. After cooling, the solution is filtered, the precipitate washed with nitrobenzene and extracted by boiling glacial acetic acid. The product in a dry state is a dark powder which dissolves in concentrated sulfuric acid to a wine-red solution. By melting this intermediate product for 7 hours in alcoholic caustic potash at 160° C.–170° C. there is obtained a dyestuff which in a dry state is a black powder and dissolves in concentrated sulfuric acid to a green solution. It gives a dull green alkaline hydrosulfite vat which dyes cotton grey tints.

We claim:

1. The process which comprises heating a compound of the following general formula:

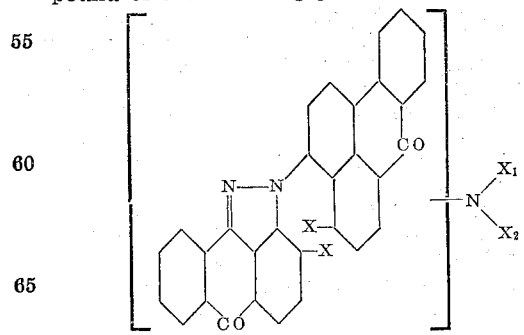

wherein X stands for hydrogen
X₁ stands for hydrogen
X₂ represents a polynuclear ring system, or

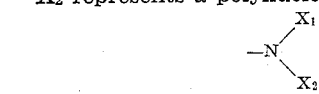

represents a polynuclear heterocyclic ring system, N, X₁ and X₂ being members of the heterocyclic nucleus with an alkaline condensing agent to a temperature of about 90° C.–200° C.

2. The process which comprises heating a compound of the following general formula:

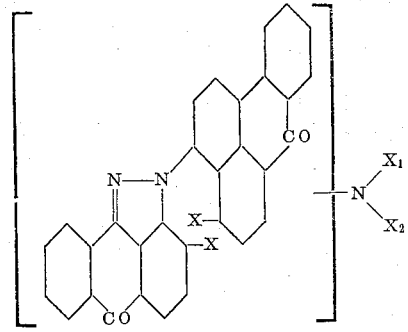

wherein X stands for hydrogen
X₁ stands for hydrogen
X₂ represents a polynuclear ring system, or

represents a polynuclear heterocyclic ring system, N, X₁ and X₂ being members of the heterocyclic nucleus with an alkaline condensing agent in the presence of an inert organic diluent to a temperature of about 90° C.–200° C.

3. The process which comprises heating a compound of the following general formula:

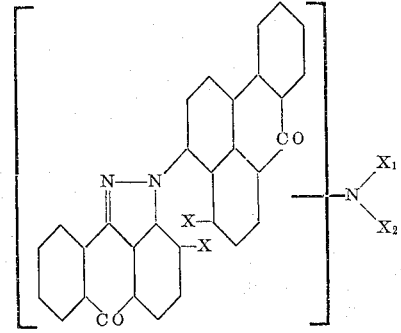

wherein X stands for hydrogen
X₁ stands for hydrogen
X₂ represents a polynuclear ring system, or

represents a polynuclear heterocyclic ring system, N, X₁ and X₂ being members of the heterocyclic nucleus with caustic potash to a temperature of about 90° C.–200° C.

4. The process which comprises heating a compound of the following probable formula:

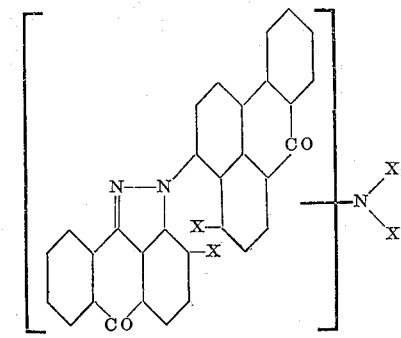

wherein X stands for hydrogen
X₁ stands for hydrogen $X_2$ represents a polynuclear ring system, or

represents a polynuclear heterocyclic ring system, N, $X_1$ and $X_2$ being members of the heterocyclic nucleus with caustic potash in the presence of an inert organic diluent to a temperature of about 90° C.–200° C.

5. The process which comprises heating a compound of the following formula:

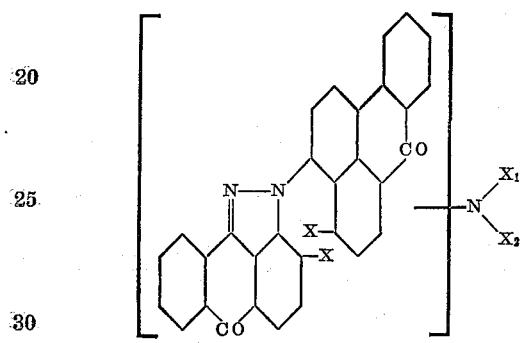

wherein X stands for hydrogen
$X_1$ stands for hydrogen
$X_2$ represents a polynuclear ring system, or

represents a polynuclear heterocyclic ring system, N, $X_1$ and $X_2$ being members of the heterocyclic nucleus with caustic potash in the presence of ethyl alcohol to a temperature of about 100° C.

6. The process which comprises heating a compound of the following probable formula:

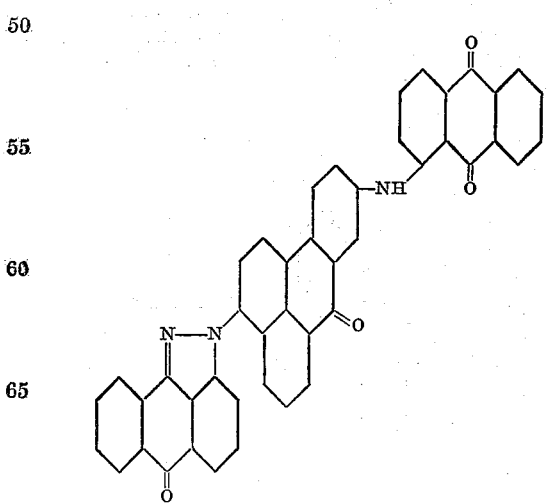

with caustic potash in the presence of ethyl alcohol to a temperature of about 100° C.

7. The compounds substantially identical with those which are obtainable by heating with an alkaline condensing agent to a temperature of 90° C.–200° C. a compound of the following general formula:

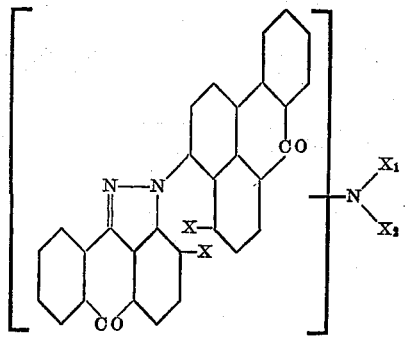

wherein X stands for hydrogen
$X_1$ stands for hydrogen
$X_2$ represents a polynuclear ring system, or

represents a polynuclear heterocyclic ring system, N, $X_1$ and $X_2$ being members of the heterocyclic nucleus, said products being dark pastes and in the dry state bluish-violet, violet-black or greenish-black powders dyeing cotton in a blue vat, in some cases in a grey or green vat, blue, grey or green shades of excellent properties of fastness.

8. The compound substantially identical with that which is obtainable by heating with caustic potash in the presence of ethyl alcohol to a temperature of about 100° C. a compound of the following formula:

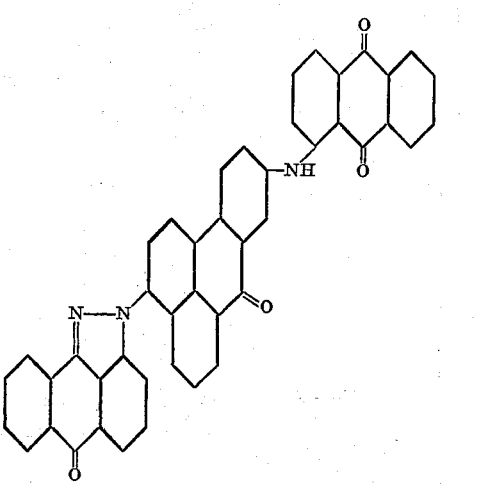

said product being a nearly black paste, in the dry state a black dyestuff powder, which dyes cotton in a blue alkaline hydrosulfite vat greenish blue-grey shades of excellent properties of fastness.

9. The compound substantially identical with that which is obtainable by heating with caustic potash in the presence of ethyl alcohol to a temperature of about 100° C. a compound of the following formula:

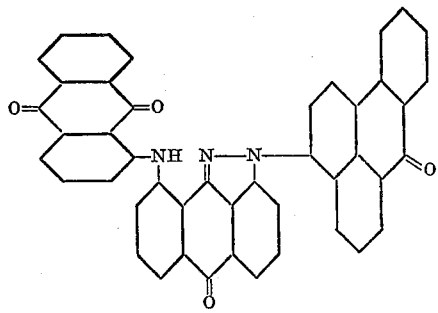

said product dyeing cotton from a greenish grey-blue vat intense greenish grey-blue tints.

10. The process which comprises heating a compound of the general formula:

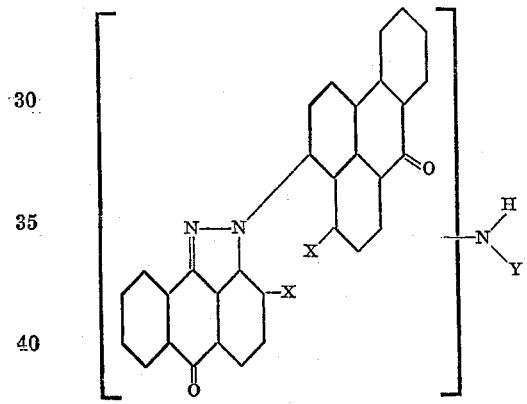

wherein X stands for hydrogen and Y represents an anthraquinonyl group with caustic potash in the presence of ethyl alcohol to a temperature of about 100° C.

11. The process which comprises heating a compound of the general formula:

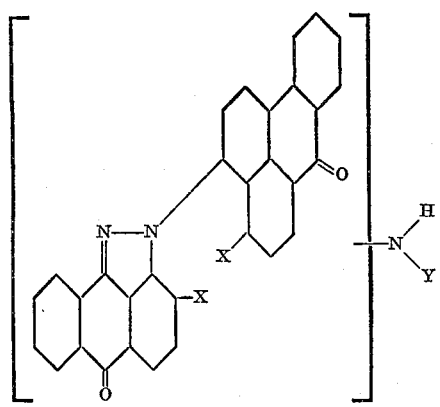

wherein X stands for hydrogen and Y represents an alpha-anthraquinonyl group with caustic potash in the presence of ethyl alcohol to a temperature of about 100° C.

12. The process which comprises heating a compound of the following probable formula:

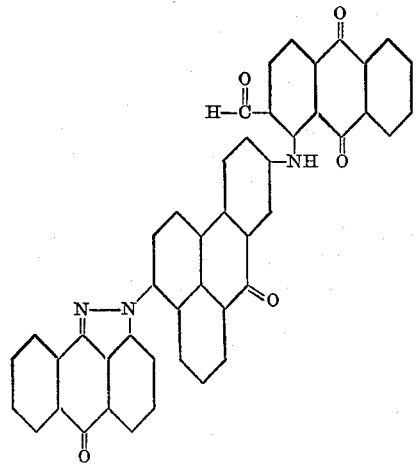

with caustic potash in the presence of ethyl alcohol to a temperature of about 100° C.

13. The process which comprises heating a compound of the following probable formula:

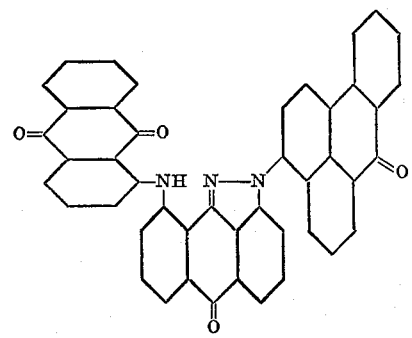

with caustic potash in the presence of ethyl alcohol to a temperature of about 100° C.

14. The compounds substantially identical with those obtainable by heating with caustic potash in the presence of ethyl alcohol to a temperature of about 100° C. a compound of the following general formula:

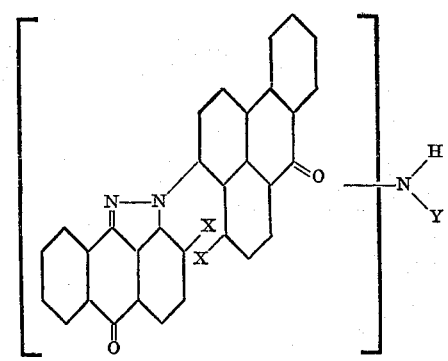

wherein X stands for hydrogen and Y represents an anthraquinonyl group.

15. The compounds substantially identical with those obtainable by heating with caustic potash in the presence of ethyl alcohol to a temperature of about 100° C. a compound of the following general formula:
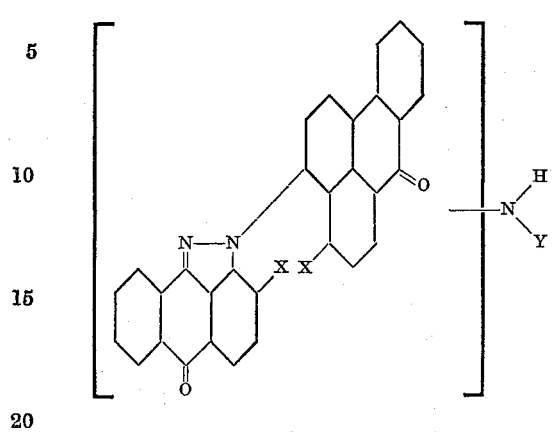
wherein X stands for hydrogen and
Y represents an alpha-anthraquinonyl group.
16. The compound substantially identical with that obtainable by heating with caustic potash to a temperature of about 100° C. a compound of the following formula:
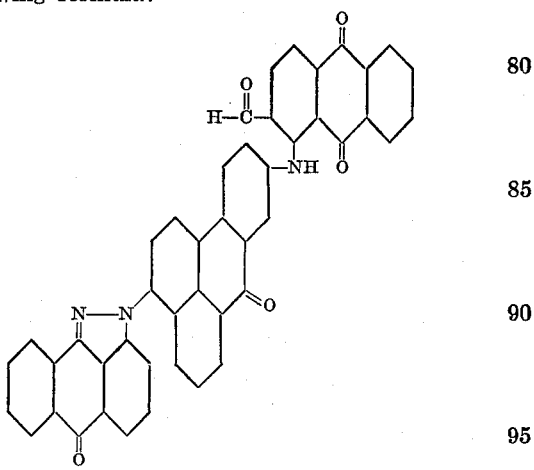
KARL WILKE.
JOSEF STOCK.
FRITZ SCHUBERT.